US010666355B1

(12) United States Patent
Chen et al.

(10) Patent No.: US 10,666,355 B1
(45) Date of Patent: May 26, 2020

(54) SCANNING-TYPE OPTICAL ANTENNA AND CONTROL METHOD THEREOF

(71) Applicant: Industrial Technology Research Institute, Hsin-Chu (TW)

(72) Inventors: Ruei-Bin Chen, Hsinchu (TW); Ming-Chien Tseng, Hsinchu County (TW); Cheng-Huan Chen, Taoyuan County (TW); Chi-Yu Bai, Taichung (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 0 days.

(21) Appl. No.: 16/233,415

(22) Filed: Dec. 27, 2018

(30) Foreign Application Priority Data

Dec. 13, 2018 (TW) .............................. 107145047 A

(51) Int. Cl.
*H04B 10/112* (2013.01)
*G02B 26/08* (2006.01)

(52) U.S. Cl.
CPC ..... *H04B 10/1125* (2013.01); *G02B 26/0816* (2013.01)

(58) Field of Classification Search
None
See application file for complete search history.

(56) References Cited

U.S. PATENT DOCUMENTS

| 3,790,278 A * | 2/1974 | Buczek ................... G01S 17/50 356/28 |
| 5,426,437 A | 6/1995 | Cross et al. |
| 7,058,307 B2 | 6/2006 | Sakanaka |

(Continued)

FOREIGN PATENT DOCUMENTS

| CN | 102983904 A | 3/2013 |
| CN | 102324962 B | 4/2014 |

(Continued)

OTHER PUBLICATIONS

Taiwan Patent Office "Notice of Allowance" dated Sep. 26, 2019, Taiwan.

(Continued)

*Primary Examiner* — David W Lambert
(74) *Attorney, Agent, or Firm* — WPAT, PC

(57) ABSTRACT

A scanning-type optical antenna is provided, which includes a housing, a fine-tune mirror, a light signal emitter, a light signal receiver, a scanning light receiver and a rotational mechanism. The housing includes a window. The scanning light receiver disposed on the housing receives an input sector scanning light from a target antenna to generate plural light speckles. The rotational mechanism mounts the housing and adjusts the deflection angle between the housing and the target antenna according to the light speckles. The fine-tune mirror is disposed outside the housing and corresponding to the window. The light signal emitter inside the housing transmits an output signal light to the target antenna after being reflected by the fine-tune mirror through the window. The input signal light of the target antenna is transmitted to the light signal receiver inside the housing after being reflected by the fine-tune mirror and passing through the window.

21 Claims, 15 Drawing Sheets

(56) References Cited

U.S. PATENT DOCUMENTS

| | | | |
|---|---|---|---|
| 8,253,619 | B2 | 8/2012 | Holbrook et al. |
| 10,003,168 | B1* | 6/2018 | Villeneuve ............. G02B 27/10 |
| 2003/0044636 | A1* | 3/2003 | Sakanaka ........... G02B 26/0816 |
| | | | 428/647 |
| 2007/0274727 | A1 | 11/2007 | Haruyama et al. |
| 2010/0117885 | A1* | 5/2010 | Holbrook ............... H04N 1/107 |
| | | | 342/22 |
| 2012/0114337 | A1* | 5/2012 | Aoki .................. H04B 10/1121 |
| | | | 398/135 |
| 2017/0070289 | A1 | 3/2017 | Takahashi et al. |

FOREIGN PATENT DOCUMENTS

| | | |
|---|---|---|
| CN | 107664794 A | 2/2018 |
| TW | I357696 | 2/2012 |
| TW | I617144 | 3/2018 |
| TW | 201830348 | 8/2018 |

OTHER PUBLICATIONS

Yoshinori Arimoto et al., "1.28 Terabit/s (32x40 Gbit/s) WDM Transmission System for Free Space Optical Communications", Dec. 2009, vol. 27, No. 9, IEEE Journal on Selected Areas in Communications.

Hai-Han Lu, et al., "150 m/280 Gbps WDM/SDM FSO link based on OEO-based BLS and afocal telescopes", Jun. 15, 2016, pp. 2835-2838, vol. 41, No. 12, Optics Letters.

H. Kotake, et al., "A new ground-to-train communication system using free-space optics technology", 2006, pp. 683-692, vol. 88, WIT Transactions on The Built Environment.

Masato Hiruta, et al., "A Study on Optical Wireless Train Communication System using Mobile Object Tracking Technique", Feb. 15-18, 2009, pp. 35-40, ICACT.

Kazuki Nakamura et al., "Development of Broadband Telecommunications System for Railways Using Laser Technology", 2015, pp. 45-56, vol. 190, No. 3, Electrical Engineering in Japan.

Kosuke Mori et al., "Fast Handover Mechanism for High Data Rate Ground-to-Train Free-Space Optical Communication Transceiver for Internet Streaming Applications", 2014, pp. 499-504, IEEE.

Joshua Rodriguez et al., "Multi-beam and single-chip LIDAR with discrete beam steering by Digital Micromirror Device", Feb. 23, 2018, vol. 10526, Proc. of SPIE.

Qingjie Liu et al., "Outdoor Target Tracking and Positioning Based on Fisheye Lens", 2009, pp. 158-162, International Conference on Artificial Intelligence and Computational Intelligence.

* cited by examiner

| S101 | The beam emitted from the scanning light source of the scanning light emitter passes through the beam forming element of the scanning light emitter to generate an output sector scanning light |
|---|---|
| S102 | The scanning mirror of the scanning light emitter is continuously rotating to reflect the output sector scanning light so as to change the direction of the output sector scanning light and emits the output sector scanning light to a target antenna |

FIG. 10

SCANNING-TYPE OPTICAL ANTENNA AND CONTROL METHOD THEREOF

CROSS REFERENCE TO RELATED APPLICATION

All related applications are incorporated by reference. The present application is based on, and claims priority from, Taiwan Application Serial Number 107145047, filed on Dec. 13, 2018, the disclosure of which is hereby incorporated by reference herein in its entirety.

TECHNICAL FIELD

The technical field relates to an optical antenna, in particular to a scanning-type optical antenna. The technical field further relates to the control method of the scanning-type optical antenna.

BACKGROUND

FSO (Free Space Optics) systems are a novel wireless transmission system, which can transmit signals via light and the transmission medium thereof is air. FSO systems can be swiftly installed without complicated wiring and can be reused after being recovered, so are very suitable for temporary mobile network systems. Therefore, FSO systems have become the best solution in the last mile of metropolitan area networks.

A currently available FSO system usually includes several optical antennas. In general, a currently available optical antenna includes a light signal emitter and a light signal receiver. The optical antenna and a target antenna should be disposed at the same plane. Besides, the light signal emitter of the optical antenna should aim at the light signal receiver of the target antenna so as to transmit signal lights thereto. Similarly, the light signal receiver of the optical antenna should aim at the light signal emitter of the target antenna so as to receive signal lights therefrom.

SUMMARY

An embodiment of the present disclosure relates to a scanning-type optical antenna, which includes a housing, a fine-tune mirror, a light signal emitter, a light signal receiver, a scanning light receiver, a scanning light emitter and a rotational mechanism. The housing includes a window. The scanning light receiver is disposed on the housing and receives an input sector scanning light emitted from a target antenna to generate plural light speckles. The rotational mechanism mounts the housing and adjusts the deflection angle between the housing and the target antenna according to the light speckles. The fine-tune mirror is disposed outside the housing and corresponding to the window. The light signal emitter is disposed inside the housing and transmits an output signal light to the target antenna after being reflected by the fine-tune mirror through the window. The light signal receiver is disposed inside the housing; the input signal light of the target antenna is transmitted to the light signal receiver after being reflected by the fine-tune mirror and passing through the window.

Another embodiment of the present disclosure relates to control method for scanning-type optical antenna, which includes the following steps: receiving an input sector scanning light emitted from a target antenna by a scanning light receiver disposed on a housing to generate plural light speckles; rotating the housing according to the light speckles by a rotational mechanism to adjust a deflection angle between the housing and the target antenna; emitting an output signal light by a light signal emitter disposed inside the housing, where the output signal light is transmitted to the target antenna after passing through the window of the housing and being reflected by a fine-tune mirror; and receiving an input signal light emitted by a target antenna by a light signal receiver disposed inside the housing, where the input signal light is transmitted to the light signal receiver after being reflected by the fine-tune mirror and passing through the window.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein:

FIG. 10 is a first flow chart in accordance with the second embodiment of the present disclosure.

DETAILED DESCRIPTION

Figure 1:
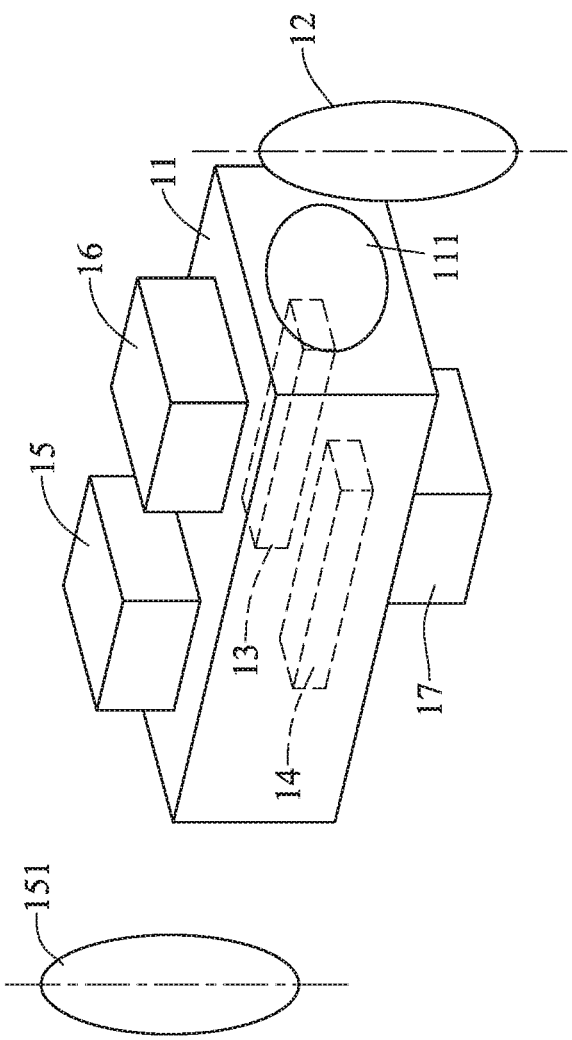
FIG. 1 is a schematic view of a structure of a scanning-type optical antenna in accordance with a first embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Please refer to FIG. 1, a schematic view of a structure of a scanning-type optical antenna in accordance with a first embodiment of the present disclosure. As shown in FIG. 1, the scanning-type optical antenna 1 includes a housing 11, a fine-tune mirror 12, a light signal emitter 13, a light signal receiver 14, a scanning light emitter 15, a scanning light receiver 16 and a rotational mechanism 17.

The housing 11 includes a window 111 disposed at one side thereof. The scanning light emitter 15 is disposed on the housing 11 and includes a scanning mirror 151. The scanning light receiver 16 is disposed on the housing 11 and receives an input sector scanning light emitted from a target antenna. For example, the scanning light receiver 16 may include a light sensing element, such as charge-coupled device (CCD), complementary metal-oxide-semiconductor (CMOS), etc., which can sense the input sector scanning light to generate plural light speckles. The rotational mechanism 17 mounts the housing 11 and adjusts the direction of the housing 11 according to the shapes and the positions of the light speckles to aim the light signal emitter 13 and the light signal receiver 14 at the target antenna so as to effectively transmit and receive signal lights. The fine-tune mirror 12 is disposed outside the housing 11 and adjacent to the window 111; besides, the position of the fine-tune mirror 12 is corresponding to the position of the window 111. The light signal emitter 13 is disposed inside the housing 11 and includes a light signal source to transmit signal lights to the target antenna. For example, the light signal source may be a laser diode or other similar electronic components. The light signal receiver 14 is disposed inside the housing 11 and receives the input signal light transmitted from the target antenna.

Figure 2:
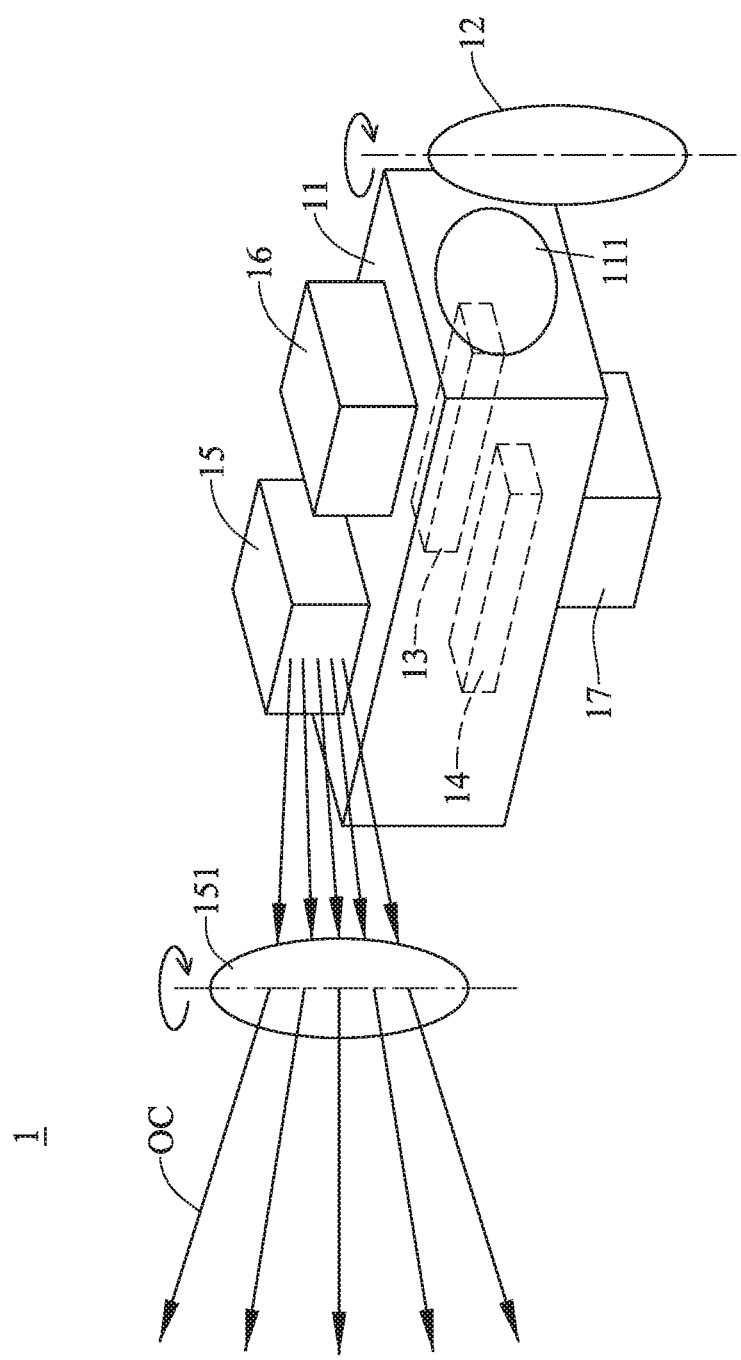
FIG. 2 is a schematic view of an operation status of a scanning light emitter of the scanning-type optical antenna in accordance with the first embodiment of the present disclosure.

Please refer to FIG. 2, a schematic view of an operation status of a scanning light emitter of the scanning-type optical antenna in accordance with the first embodiment of the present disclosure. As shown in FIG. 2, the scanning light emitter 15 emits an output sector scanning light OC to search the target antenna and change the direction of the output scanning light OC via the scanning mirror 151 so as to realize wide-angle scanning. For example, the rotational angle of the scanning mirror 151 may be 180° but not limited thereto.

Figure 3:
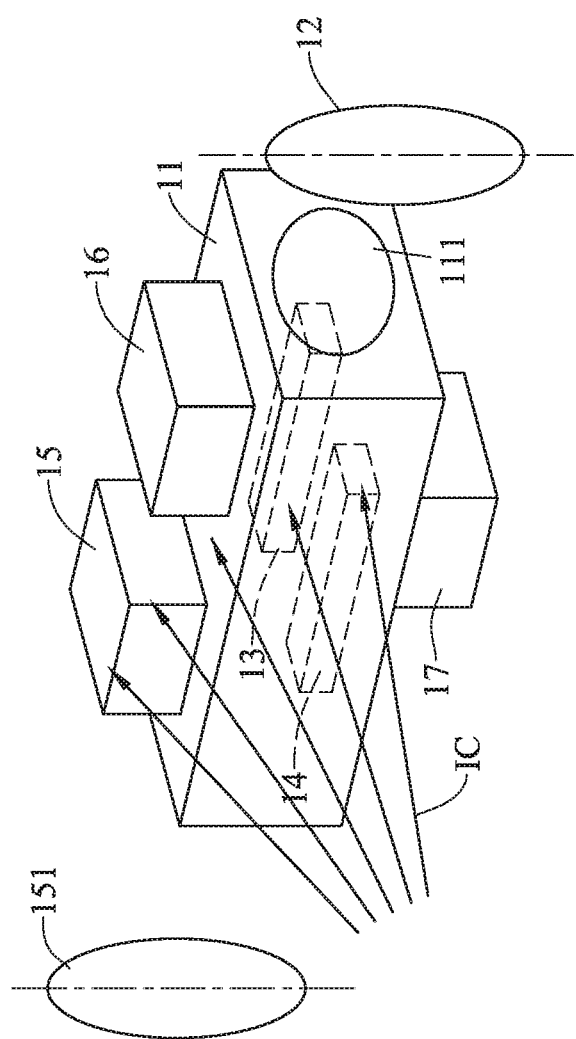
FIG. 3 is a schematic view of an operation status of a scanning light receiver of the scanning-type optical antenna in accordance with the first embodiment of the present disclosure.

Please refer to FIG. 3, a schematic view of an operation status of a scanning light receiver of the scanning-type optical antenna in accordance with the first embodiment of the present disclosure. As shown in FIG. 3, the scanning light receiver 16 receives an input sector scanning light IC emitted from the target antenna and senses the input sector scanning light IC to generate plural light speckles.

Figure 4:
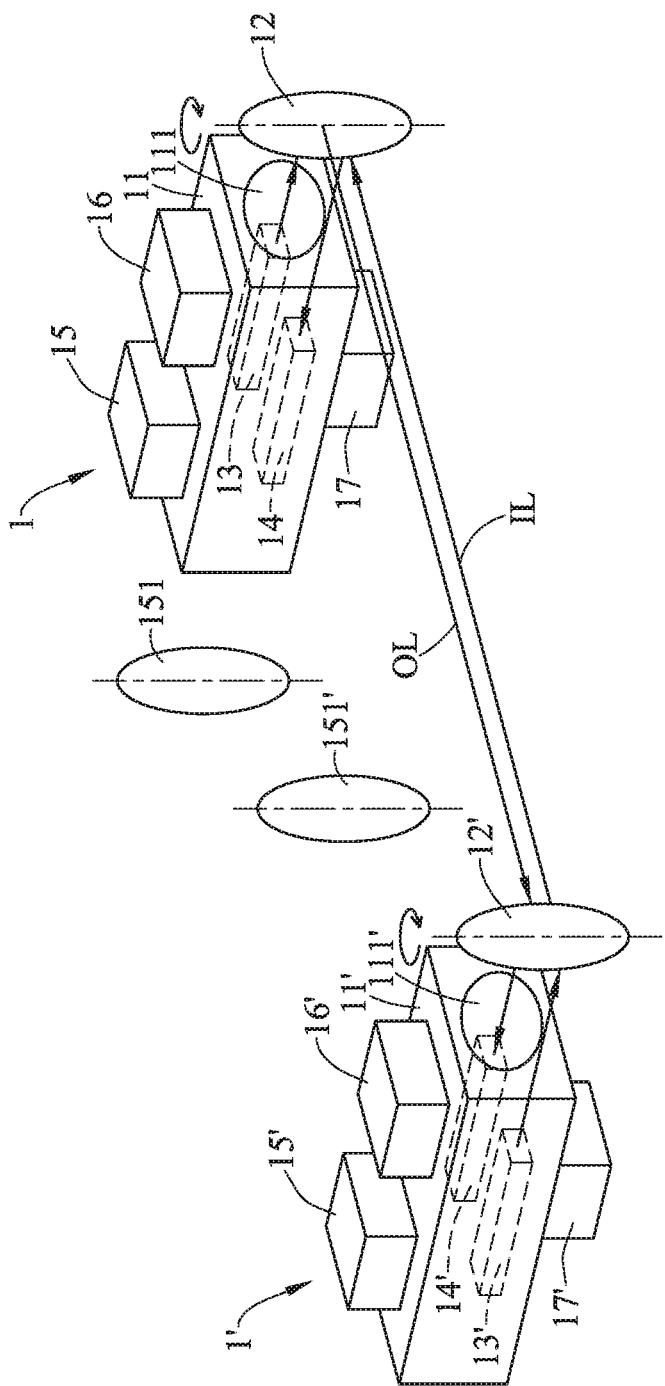
FIG. 4 is a schematic view of an operation status of a light signal emitter and a light signal receiver of the scanning-type optical antenna in accordance with the first embodiment of the present disclosure.

Please refer to FIG. 4, a schematic view of an operation status of a light signal emitter and a light signal receiver of the scanning-type optical antenna in accordance with the first embodiment of the present disclosure. As shown in FIG. 4, the light signal emitter 13 generates an output signal light OL; the output signal light OL is transmitted to the light signal receiver 14' of the target antenna 1' after passing through the window 111 and being reflected by the fine-tune mirror 12. Similarly, the input signal light IL generated by the light signal emitter 13' of the target antenna 1' is transmitted to the light signal receiver 14 of the scanning-type optical antenna 1 after passing through the window 111' and being reflected by the fine-tune mirror 12'. More specifically, the fine-tune mirrors 12 and 12' can rotate to adjust the transmission paths of the output signal light OL and the input signal light IL so as to make sure that the scanning-type optical antenna 1 can precisely transmit and receive signal lights.

As described above, the scanning-type optical antenna 1 integrates the light signal emitter 13 with the light signal receiver 14. Both of the output signal light OL transmitted from the light signal emitter 13 and the input signal light IL received by the light signal receiver 14 pass through the window 111 and are reflected by the fine-tune mirror 12. Accordingly, the transmission path of the output signal light OL and that of the input signal light IL can be considered common. In this way, the deflection angle of the scanning-type optical antenna 1 can be corrected via one rotational mechanism, which can significantly reduce the cost thereof.

In addition, the scanning-type optical antenna 1 integrates the light signal emitter 13 with the light signal receiver 14, so the light signal emitter 13 with the light signal receiver 14 have a common lens set, which can greatly decrease the complexity of the structure of the scanning-type optical antenna 1.

Moreover, the scanning-type optical antenna 1 can receive the input sector scanning light IC emitted from the target antenna 1' to track the target antenna 1', so the scanning-type optical antenna 1 can automatically and precisely aim at the target antenna 1'. Thus, the scanning-type optical antenna 1 can have better tolerance and be more conveniently to use.

The embodiment just exemplifies the present disclosure and is not intended to limit the scope of the present disclosure. Any equivalent modification and variation according to the spirit of the present disclosure is to be also included within the scope of the following claims and their equivalents.

Figure 5:
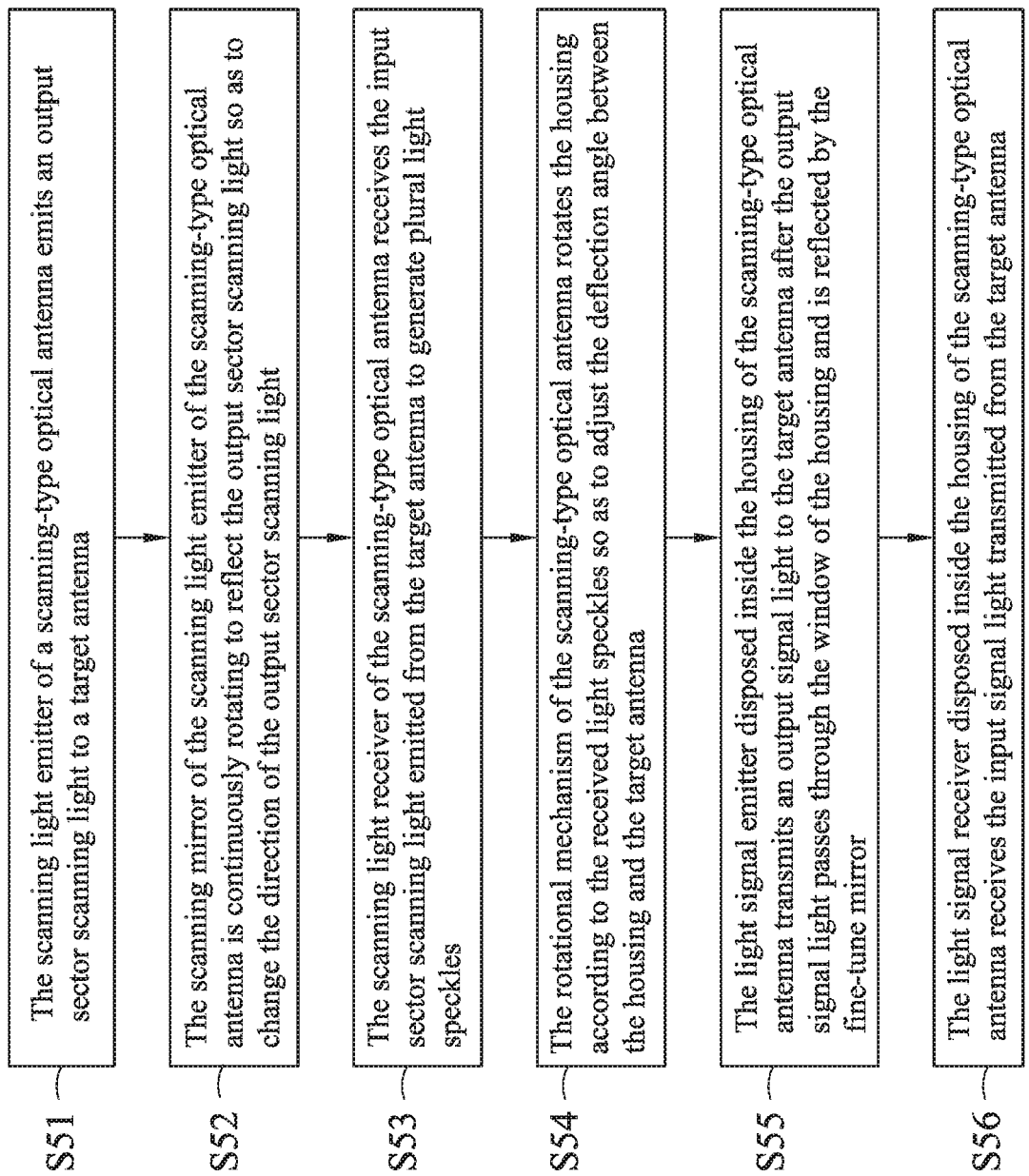
FIG. 5 is a flow chart in accordance with the first embodiment of the present disclosure.

Please refer to FIG. 5, a flow chart in accordance with the first embodiment of the present disclosure. As shown in FIG. 5, the control method of the scanning-type optical antenna 1 of the embodiment includes the following steps:

Step S51: the scanning light emitter of a scanning-type optical antenna emits an output sector scanning light to a target antenna. Meanwhile, the scanning light emitter of the target antenna also emits an input sector scanning light to the scanning-type optical antenna.

Step S52: the scanning mirror of the scanning light emitter of the scanning-type optical antenna is continuously rotating to reflect the output sector scanning light so as to change the direction of the output sector scanning light. Meanwhile, the scanning mirror of the scanning light emitter of the target antenna is also continuously rotating to reflect the input sector scanning light so as to change the direction of the input sector scanning light.

Step S53: the scanning light receiver of the scanning-type optical antenna receives the input sector scanning light emitted from the target antenna to generate plural light speckles. Similarly, the scanning light receiver of the target antenna receives the output sector scanning light emitted from the scanning-type optical antenna to generate plural light speckles.

Step S54: the rotational mechanism of the scanning-type optical antenna rotates the housing according to the received light speckles so as to adjust the deflection angle between the housing and the target antenna. Similarly, the rotational mechanism of the target antenna rotates the housing according to the received light speckles so as to adjust the deflection angle between the housing and the scanning-type optical antenna.

Step S55: the light signal emitter disposed inside the housing of the scanning-type optical antenna transmits an output signal light to the target antenna after the output signal light passes through the window of the housing and is reflected by the fine-tune mirror. Similarly, the light signal emitter disposed inside the housing of the target antenna transmits an input signal light to the scanning-type optical antenna after the input signal light passes through the window of the housing and is reflected by the fine-tune mirror.

Step S56: the light signal receiver disposed inside the housing of the scanning-type optical antenna receives the input signal light transmitted from the target antenna. Similarly, the light signal receiver disposed inside the housing of the target antenna receives the output signal light transmitted from the scanning-type optical antenna.

Figure 6:
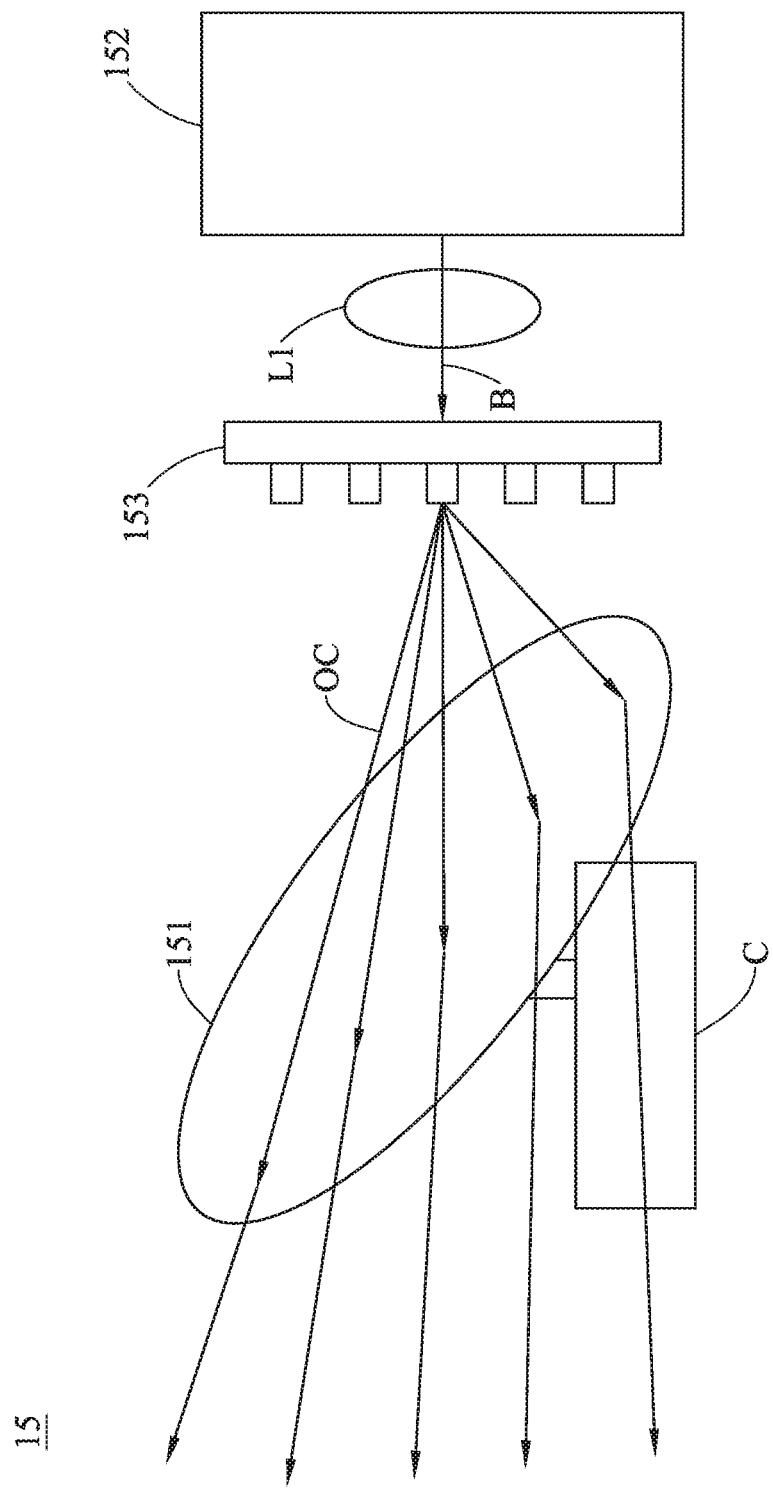
FIG. 6 is a schematic view of an optical structure of a scanning light emitter of a scanning-type optical antenna in accordance with a second embodiment of the present disclosure.

Please refer to FIG. 6, a schematic view of an optical structure of a scanning light emitter of a scanning-type optical antenna in accordance with a second embodiment of the present disclosure (please also refer to FIG. 1~FIG. 4). FIG. 6 illustrates the optical structure of the scanning light emitter 15 of the previous embodiment. As shown in FIG. 6, the scanning light emitter 15 includes a scanning mirror 151, a scanning light source 152, a beam forming element 153 and a lens L1.

The beam B emitted from the scanning light source 152 passes through the lens L1 and the beam forming element 153 to generate an output sector scanning light OC; the lens L1 can provide light condensing effect. For example, the scanning light source 152 may be an infrared light source or other similar components. For example, the beam forming element 153 may be an optical grating or other similar components. Via the diffraction characteristic of the grating, the beam B, with single wavelength, emitted from the scanning light source 152 can form the output sector scanning light OC. Therefore, the target antenna 1' receiving the output sector scanning light OC can track the position of the scanning-type optical antenna 1, as shown in Equation (1):

$$n_2 \sin \theta_2 - n_1 \sin \theta_1 = M\lambda/d = M\lambda T \qquad (1)$$

In Equation (1), $n_1$ stands for the environment refractive index before the beam incidents into the grating; $n_2$ stands for the environment refractive index after the beam passes through the grating; $\theta_1$ stands for the incidence angle of the beam incident to the grating; $\theta_2$ stands for the diffraction angle of the beam in relative to a certain order of the grating; M stands for the diffraction order; d stands for the width of one period of the structure of the grating; T stands for the period of the structure of the grating; $\lambda$ stands for the wavelength of the beam.

The scanning mirror 151 is connected to the mirror controller C of the scanning-type optical antenna 1. The mirror controller C controls the scanning mirror 151 to rotate, so the output sector scanning light OC can provide the desired scanning range.

Figure 7:
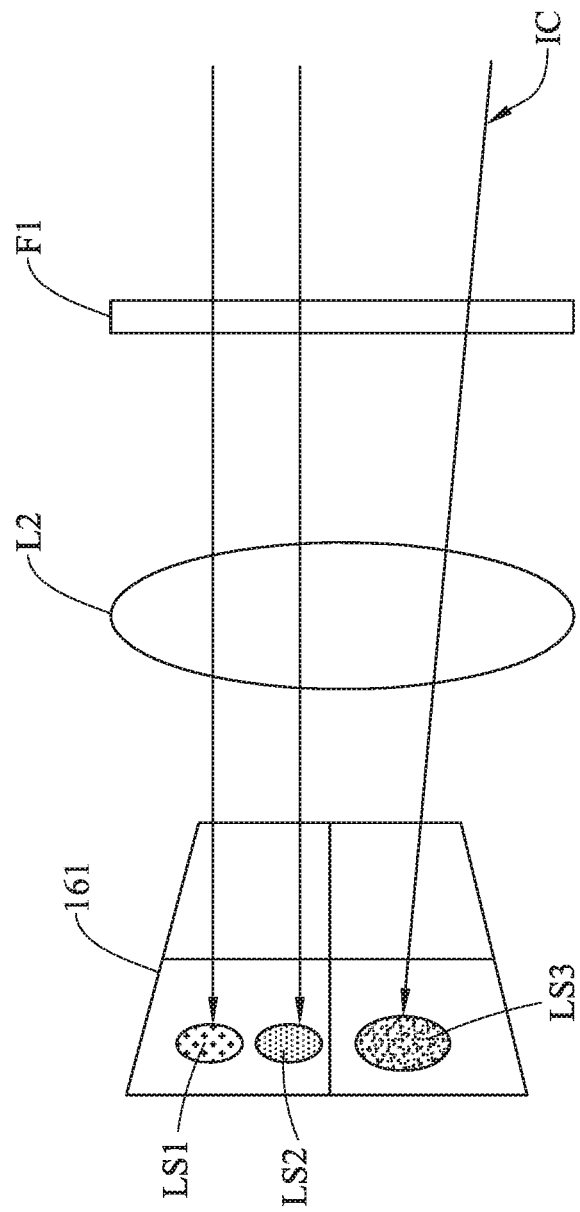
FIG. 7 is a schematic view of an optical structure of a scanning light receiver of the scanning-type optical antenna in accordance with the second embodiment of the present disclosure.

Please refer to FIG. 7, a schematic view of an optical structure of a scanning light receiver of the scanning-type optical antenna in accordance with the second embodiment of the present disclosure (please also refer to FIG. 1~FIG. 4). FIG. 7 illustrates the optical structure of the scanning light receiver 16 of the previous embodiment. As shown in FIG. 7, the scanning light receiver 16 includes a light sensing element 161, a lens L2 and an optical filter F1.

The input sector scanning light IC emitted from the target antenna 1' is received by the light sensing element 161 after passing through the optical filter F1 and the lens L2. The light sensing element 161 senses the input sector scanning light IC to generate plural light speckles LS1, LS2, LS3; the lens L2 can provide light condensing effect and the optical filter F1 can filter out noise. For example, the lens L2 may be a wide-angle optical lens and its range of receiving the input sector scanning light IC can be up to 180°.

Next, the rotational mechanism controller (not shown in the drawings) of the rotational mechanism 17 compares the shapes and the positions of the light speckles LS1, LS2, LS3 with a database so as to obtain the relation between which and the deflection angle of the housing 11 relative to the target antenna 1'. Afterward, the rotational mechanism 17 rotates the housing 11 to make the light speckles LS1, LS2, LS3 be symmetric at the center of the light sensing element 161. Consequently, the light signal emitter 13 and the light signal receiver 14 can aim the target antenna 1' so as to effectively transmit and receive signal lights.

Figure 8A:
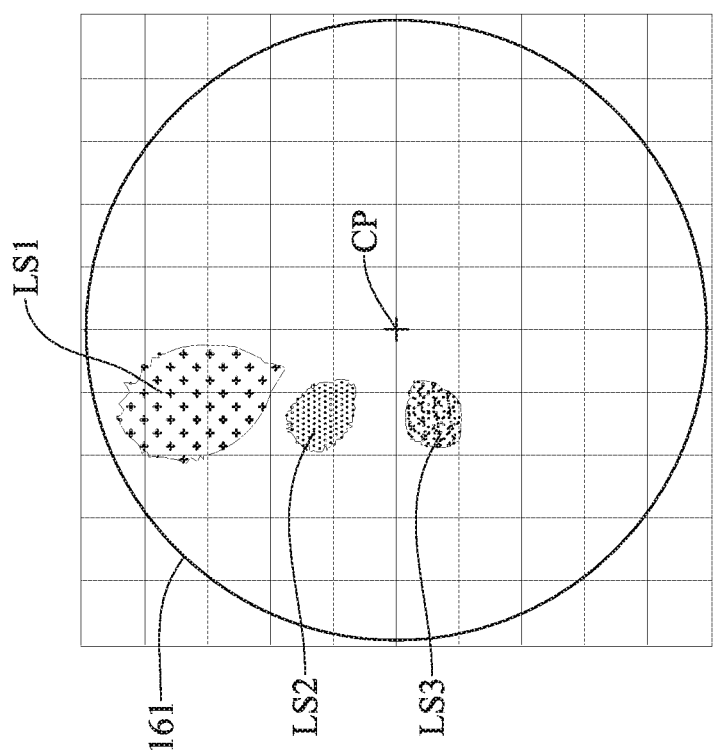
FIG. 8A is a first schematic view of a distribution of light speckles of the scanning light receiver of the scanning-type optical antenna in accordance with the second embodiment of the present disclosure.

Please refer to FIG. 8A, a first schematic view of a distribution of light speckles of the scanning light receiver of the scanning-type optical antenna in accordance with the second embodiment of the present disclosure. In the embodiment, the scanning-type optical antenna 1 is installed on a moving train; the target antennas 1' are fixed on the ground and distributed along the moving path of the train. As shown in FIG. 8A, 3 light speckles LS1, LS2, LS3 are formed after the light sensing element 161 senses 3 beams of the input sector scanning light IC of one of the target antennas 1'. Then, the rotational mechanism controller (not shown in the drawings) compares the shapes and the positions of the light speckles LS1, LS2, LS3 with the database so as to calculate the deflection angel between the housing 11 and the target antenna 1'. In the embodiment, the deflection angel is left deflected 25° and upper deflected 20°.

Figure 8B:
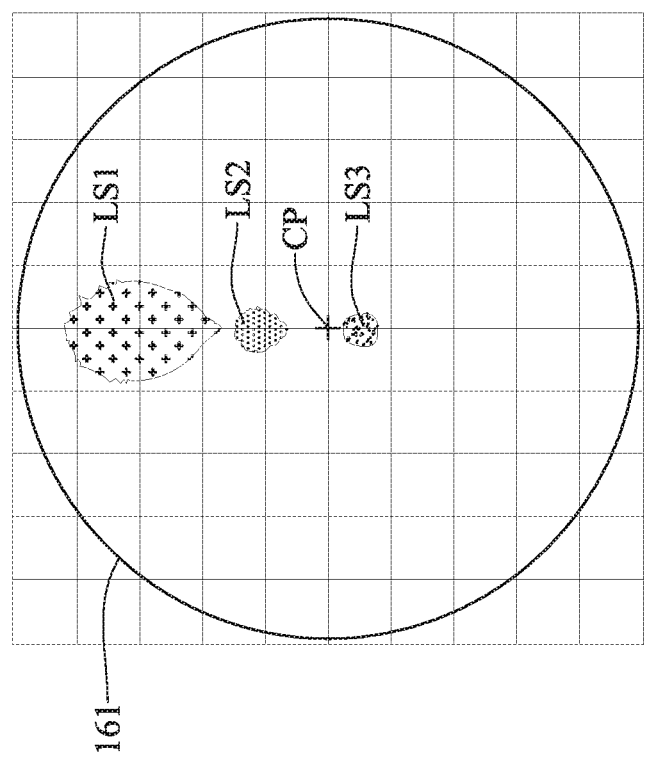
FIG. 8B is a second schematic view of a distribution of light speckles of the scanning light receiver of the scanning-type optical antenna in accordance with the second embodiment of the present disclosure.

Please refer to FIG. 8B, a second schematic view of a distribution of light speckles of the scanning light receiver of the scanning-type optical antenna in accordance with the second embodiment of the present disclosure. Similarly, 3 light speckles LS1, LS2, LS3 are, as shown in FIG. 8B, formed after the light sensing element 161 senses 3 beams of the input sector scanning light IC of one of the target antennas 1'. Then, the rotational mechanism controller compares the shapes and the positions of the light speckles LS1, LS2, LS3 with the database so as to calculate the deflection angel between the housing 11 and the target antenna 1'. In the embodiment, the deflection angel is upper deflected 20°.

Figure 8C:
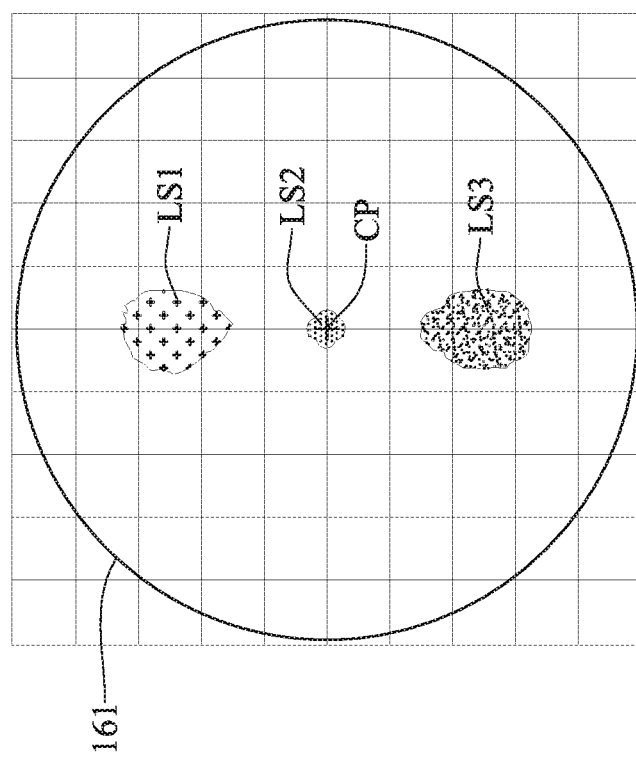
FIG. 8C is a third schematic view of a distribution of light speckles of the scanning light receiver of the scanning-type optical antenna in accordance with the second embodiment of the present disclosure.

Please refer to FIG. 8C, a third schematic view of a distribution of light speckles of the scanning light receiver of the scanning-type optical antenna in accordance with the second embodiment of the present disclosure. As shown in FIG. 8C, the rotational mechanism 17 rotates the housing 11 to make the light speckles LS1, LS2, LS3 be symmetric at the center CP of the light sensing element 161. Then, the light signal emitter 13 and the light signal receiver 14 can aim at the target antenna 1', so can effectively transmit and receive signal lights. After the light speckles LS1, LS2, LS3 is symmetric at the center CP of the light sensing element 161, the deformation of the light speckle LS1 is equal to that of the light speckle LS3 and the light speckle LS2 coincides the center CP of the light sensing element 161. Similarly, if the quantity of the light speckles is more than 3, the rotational mechanism 17 can also use the same process to make the light speckles be symmetric at the center CP of the light sensing element 161.

Figure 8D:
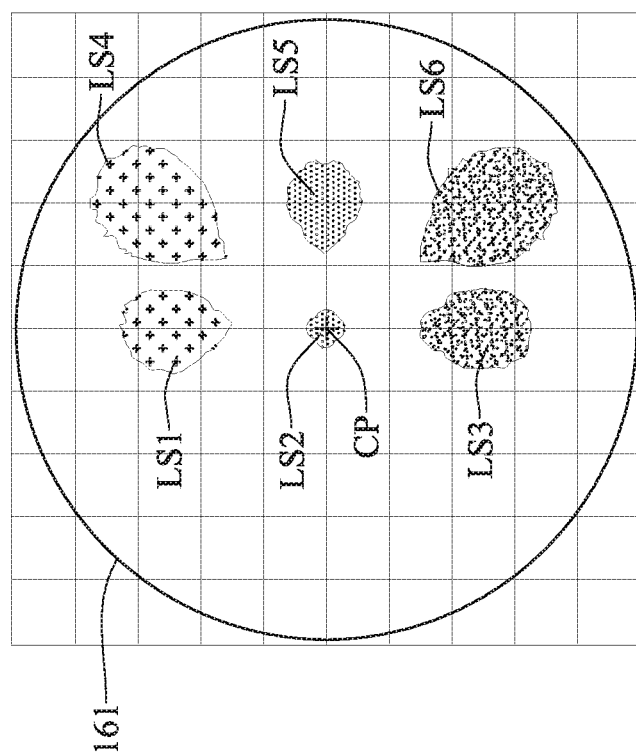
FIG. 8D is a fourth schematic view of a distribution of light speckles of the scanning light receiver of the scanning-type optical antenna in accordance with the second embodiment of the present disclosure.

Please refer to FIG. 8D, a fourth schematic view of a distribution of light speckles of the scanning light receiver of the scanning-type optical antenna in accordance with the second embodiment of the present disclosure. As described above, the scanning-type optical antenna 1 is installed on a moving train; the target antennas 1' are fixed on the ground and distributed along the moving path of the train. Thus, when the train moves to the position between two target antennas 1', the scanning light receiver 16 of the scanning-type optical antenna 1 may receive the input sector scanning lights IC emitted from these target antennas 1' at the same time, and sense two sets of light speckles. As shown in FIG. 8D, 6 light speckles LS1, LS2, LS3, LS4, LS5, LS6 are formed after the light sensing element 161 senses 6 beams of the input sector scanning lights IC emitted from 2 target antennas 1', where the light speckles LS1, LS2, LS3 are corresponding to one target antennas 1' and the light speckles LS4, LS5, LS6 are corresponding to the other. In the meanwhile, the rotational mechanism controller compares the total strength and the total fullness (deformation) of the light speckles LS1, LS2, LS3 with those of the light speckles LS4, LS5, LS6, and then makes the adjustment according to the comparison result. For example, if the total strength and the total fullness of the light speckles LS4, LS5, LS6 are greater than those of the light speckles LS1, LS2, LS3, the rotational mechanism controller makes the adjustment according to the light speckles LS4, LS5, LS6 and controls the rotational mechanism 17 to rotate the housing 11 so as to make the light speckles LS4, LS5, LS6 be symmetric at the center CP of the light sensing element 161. In this way, the scanning-type optical antenna 1 can switch the target antennas 1' according to the characteristics of the sensed light speckles so as to avoid that the signal transmission is interrupted.

Figure 9:
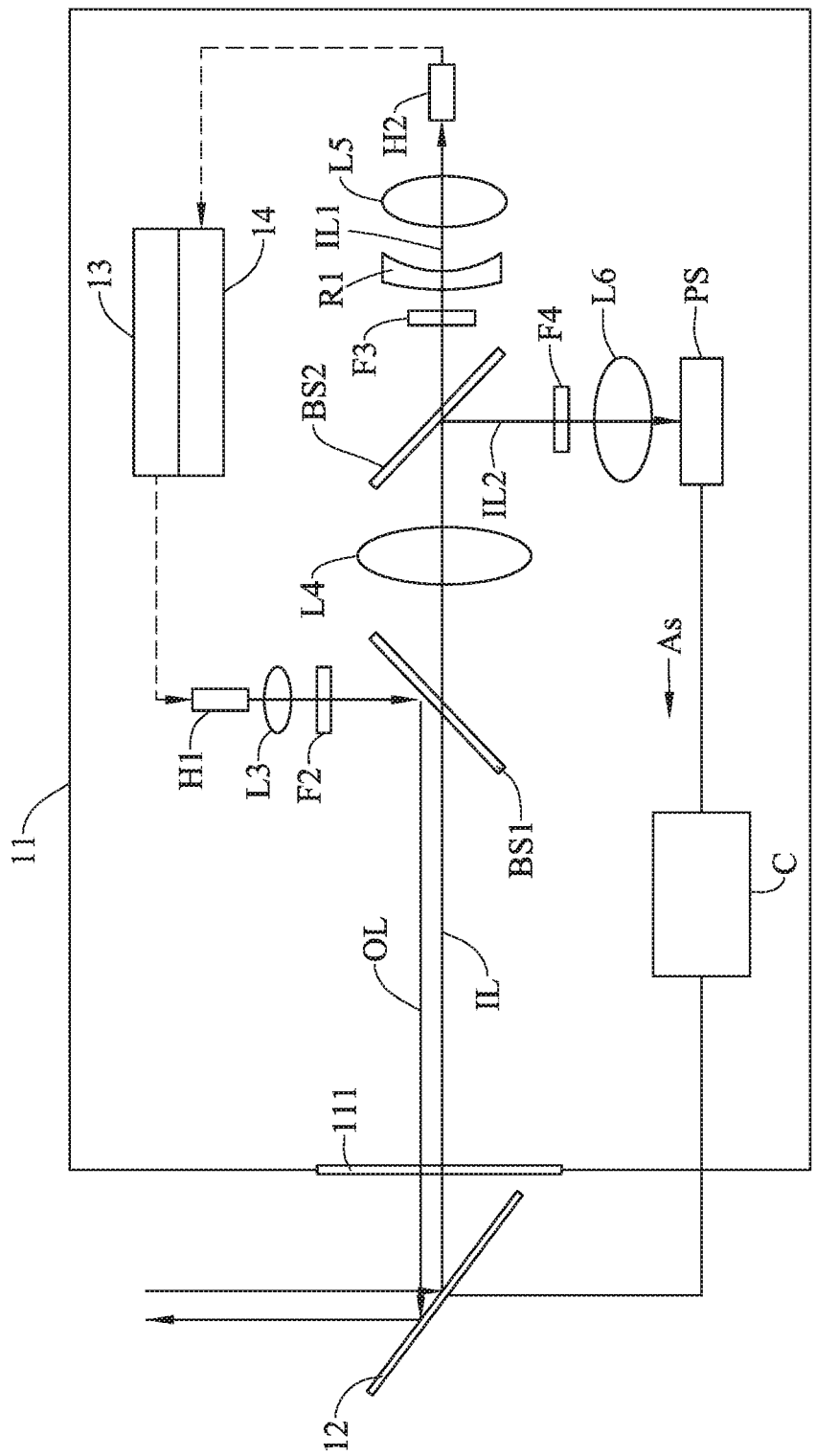
FIG. 9 is a schematic view of an optical transmitting/receiving structure of the scanning-type optical antenna in accordance with the second embodiment of the present disclosure.

Please refer to FIG. 9, a schematic view of an optical transmitting/receiving structure of the scanning-type optical antenna in accordance with the second embodiment of the present disclosure (please also refer to FIG. 1~FIG. 4). FIG. 9 illustrates the optical transmitting/receiving structure of the scanning-type optical antenna 1 of the previous embodiment. As shown in FIG. 9, the light transmission path of the light signal emitter 13 includes a fiber head H1, a lens L3, an optical filter F2 and a first beam splitter BS1.

The output signal light OL emitted from the light signal emitter 13 is outputted from the filter head H1. Then, the output signal light OL passes through the lens L3, the optical filter F2 to the first beam splitter BS1. The output signal light OL reaches the fine-tune mirror 12 after being reflected by the first beam splitter BS1 and is reflected by the fine-tune mirror 12 to the target antenna 1'; the lens L3 can provide light condensing effect and the optical filter F2 can filter out noise.

The light transmission path of the light signal receiver 14 includes the first beam splitter BS1, a lens L4, a second beam splitter BS2, an optical filter F3, a concave lens R1, a lens L5, a fiber head H2, an optical filter F4, a lens L6 and a position sensor PS. In addition, the scanning-type optical antenna 1 further includes a mirror controller C.

After passing through the first beam splitter BS1, the input signal light IL passes through the lens L4 to the second beam splitter BS2. Then, the input signal light IL is split by the second beam splitter BS2 into a first input signal light IL1 and a second input signal light IL2. And, the first input signal light IL1 passes through the optical filter F3, the concave lens R1 and the lens L5 to the fiber head H2 of the optical signal receiver 14. The combination of the concave lens R1 and the lens L5 can provide light condensing effect to further concentrate the first input signal light IL1 and the optical filter F3 can filter out noise. In another embodiment, the concave lens R1 can be omitted from the light transmission path of the light signal receiver 14, so the light condensing effect is provided by only the lens L5.

The second input signal light IL2 passes through the optical filter F4 and the lens L6 to the position sensor PS. The position sensor PS generates an adjustment signal AS according to the second input signal light IL2 and transmits the adjustment signal AS to the mirror controller C. Wherein, the lens L6 can provide light condensing effect and the optical filter F4 can filter out noise. Next, the mirror controller C adjusts the fine-tune mirror 12 according to the adjustment signal AS so as to fine-tune the input signal light IL, such that the first input signal light IL1 can more precisely aim at the fiber head H2 of the light signal receiver 14.

In the embodiment, the light transmission path of the first input signal light IL1 is perpendicular to the light transmission path of the second input signal light IL2. In other words, the straight line connecting the center of the second beam splitter BS2 to the fiber head H2 is perpendicular to the straight line connecting the center of the second beam splitter BS2 to the position sensor PS.

Via the above specially-designed optical structure, the light signal receiver 14 and the position sensor PS can be coupled to and corresponding to each other, so the light signal receiver 14 and the position sensor PS can be considered at the same optical axis. Therefore, the mirror controller C can more effectively fine-tune the input signal light IL to more precisely aim the first input signal light IL1 at the fiber head H2 of the light signal receiver 14.

The embodiment just exemplifies the present disclosure and is not intended to limit the scope of the present disclosure. Any equivalent modification and variation according to the spirit of the present disclosure is to be also included within the scope of the following claims and their equivalents.

It is worthy to point out that both of the light signal emitter and the light signal receiver of the currently available optical antenna need a rotational mechanism so as to aim at the light signal receiver and the light signal emitter of a target antenna, which significantly increases the cost thereof. On the contrary, according to one embodiment of the present disclosure, the scanning-type optical antenna integrates the light signal emitter with the light signal receiver, so the light signal emitter and the light signal receiver have a common light transmission path. Therefore, the deflection angle of the scanning-type optical antenna can be corrected by only one rotational mechanism, which can reduce the cost thereof.

Besides, both of the light signal emitter and the light signal receivers of the currently available optical antenna need a dedicated lens set, so the structure of the currently available optical antenna is of high complexity. On the contrary, according to one embodiment of the present disclosure, the scanning-type optical antenna integrates the light signal emitter with the light signal receiver, so the light signal emitter and the light signal receiver have a common lens set. Thus, the complexity of the structure of the scanning-type optical antenna can be significantly reduced.

Further, the currently available optical antenna can emit signals in only one direction, so cannot accurately aim at the target antenna without manual manipulation or additional assistant tools (e.g. visible laser or scope). Accordingly, the currently available optical antenna is of low tolerance, inconvenient to use and inefficient. On the contrary, according to one embodiment of the present disclosure, the scanning-type optical antenna can emit the sector scanning light to the target antenna, so the target antenna can track the scanning-type optical antenna. In addition, the scanning-type optical antenna can further receive the sector scanning light emitted from the target antenna to track the target antenna. In this way, the scanning-type optical antenna can automatically and accurately aim at the target antenna without manual manipulation or additional assistant tools. Therefore, the scanning-type optical antenna is of high tolerance, convenient to use and efficient.

Moreover, the currently available optical antenna cannot be applied to mobile vehicles and transportation systems, such as MRT systems, railway systems, HSR systems, LRT systems, automobiles, aircrafts, etc., so the application thereof is limited. On the contrary, according to one embodiment of the present disclosure, the scanning-type optical antenna can automatically and accurately aim at the target antenna, so is very suitable for various mobile vehicles and transportation systems.

Furthermore, according to one embodiment of the present disclosure, the optical transmitting/receiving structure of the scanning-type optical antenna is specially designed to make the light signal receiver and the position sensor be coupled to and corresponding to each other. In this way, the light signal receiver and the position sensor can be considered at the same optical axis, so the mirror controller can more effectively fine-tune the input signal light to precisely aim the input signal light at the light signal receiver. Accordingly, the signal quality of the scanning-type optical antenna can be improved.

Please refer to FIG. 10, a first flow chart in accordance with the second embodiment of the present disclosure. The control method of the scanning light emitter 15 of the scanning-type optical antenna 1 of the embodiment includes the following steps:

Step S101: the beam emitted from the scanning light source of the scanning light emitter passes through the beam forming element of the scanning light emitter to generate an output sector scanning light.

Step S102: the scanning mirror of the scanning light emitter is continuously rotating to reflect the output sector scanning light so as to change the direction of the output sector scanning light and transmit the output sector scanning light to a target antenna.

Figure 11:
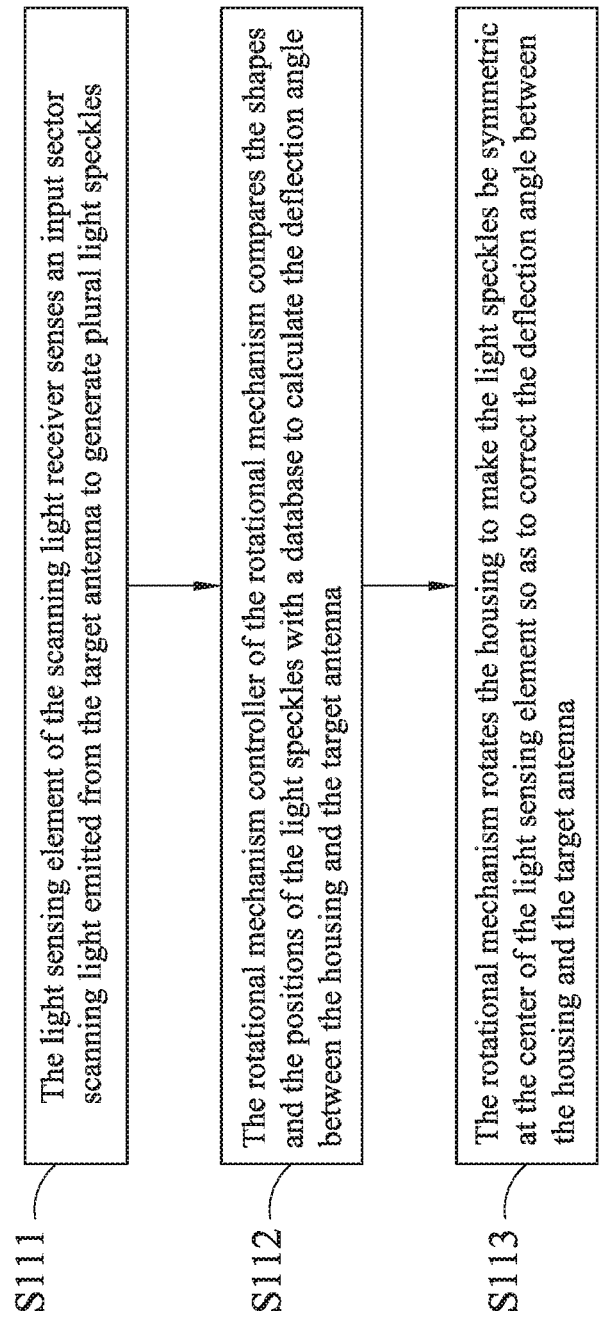
FIG. 11 is a second flow chart in accordance with the second embodiment of the present disclosure.

Please refer to FIG. 11, a second flow chart in accordance with the second embodiment of the present disclosure. The control method of the scanning light receiver 16 of the scanning-type optical antenna 1 of the embodiment includes the following steps:

Step S111: the light sensing element of the scanning light receiver senses an input sector scanning light emitted from the target antenna to generate plural light speckles.

Step S112: the rotational mechanism controller of the rotational mechanism compares the shapes and the positions of the light speckles with a database to calculate the deflection angle between the housing and the target antenna.

Step S113: the rotational mechanism rotates the housing to make the light speckles be symmetric at the center of the light sensing element so as to correct the deflection angle between the housing and the target antenna.

Figure 12:
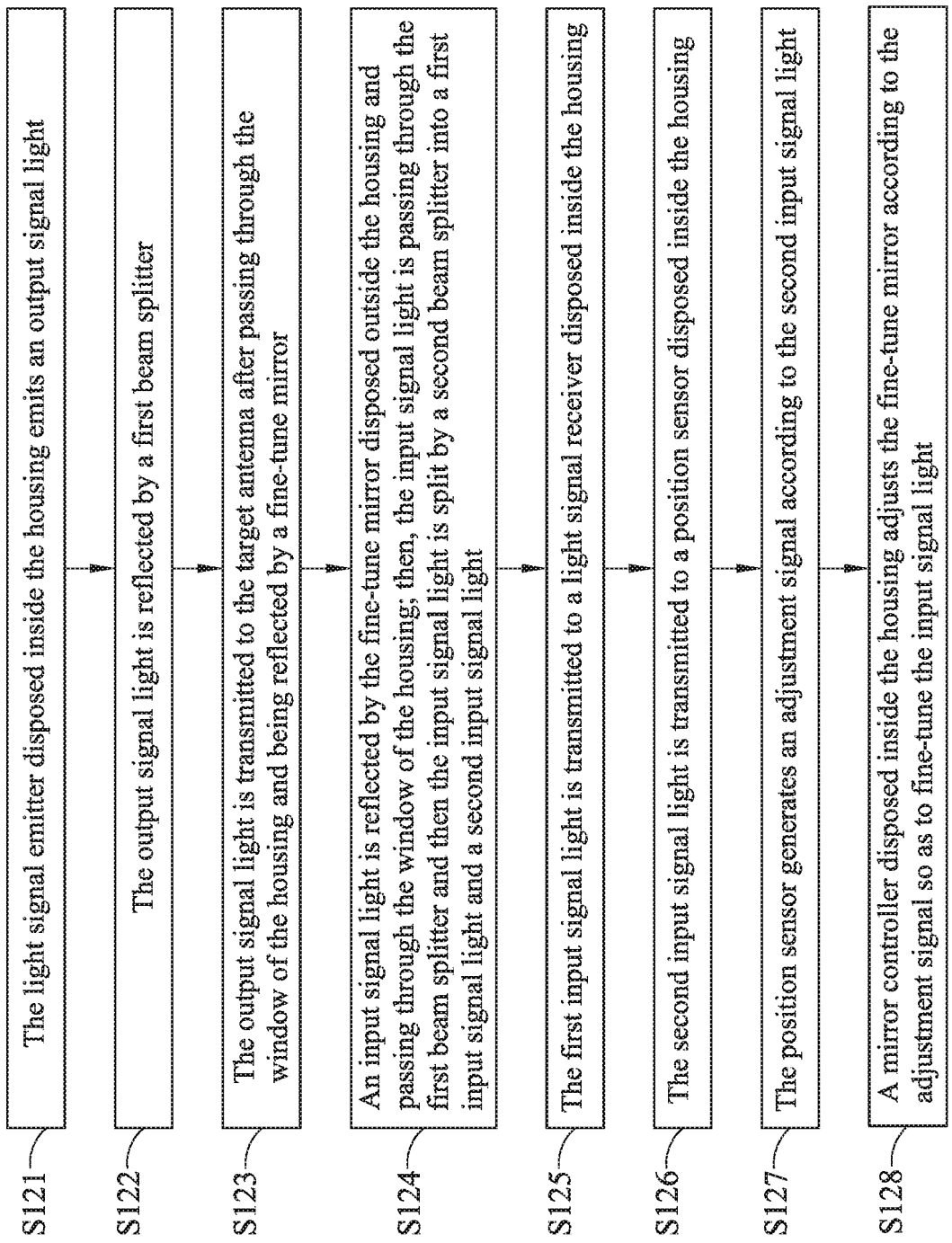
FIG. 12 is a third flow chart in accordance with the second embodiment of the present disclosure.

Please refer to FIG. 12, a third flow chart in accordance with the second embodiment of the present disclosure. The control method of the optical transmitting/receiving structure of the scanning-type optical antenna 1 of the embodiment includes the following steps:

Step S121: the light signal emitter disposed inside the housing emits an output signal light.

Step S122: the output signal light is reflected by a first beam splitter.

Step S123: the output signal light is transmitted to the target antenna after passing through the window of the housing and being reflected by a fine-tune mirror.

Step S124: an input signal light is reflected by the fine-tune mirror disposed outside the housing and passing through the window of the housing; then, the input signal light is passing through the first beam splitter and then the input signal light is split by a second beam splitter into a first input signal light and a second input signal light.

Step S125: the first input signal light is transmitted to a light signal receiver disposed inside the housing.

Step S126: the second input signal light is transmitted to a position sensor disposed inside the housing.

Step S127: the position sensor generates an adjustment signal according to the second input signal light.

Step S128: a mirror controller disposed inside the housing adjusts the fine-tune mirror according to the adjustment signal so as to fine-tune the input signal light.

In summation of the description above, according to one embodiment of the present disclosure, the scanning-type optical antenna integrates the light signal emitter with the light signal receiver, so the light signal emitter and the light signal receiver have a common light transmission path. Therefore, the deflection angle of the scanning-type optical antenna can be corrected by only one rotational mechanism, which can reduce the cost thereof.

Besides, according to one embodiment of the present disclosure, the scanning-type optical antenna integrates the light signal emitter with the light signal receiver, so the light signal emitter and the light signal receiver have a common lens set. Thus, the complexity of the structure of the scanning-type optical antenna can be significantly reduced.

Further, according to one embodiment of the present disclosure, the scanning-type optical antenna can emit the sector scanning light to the target antenna, so the target antenna can track the scanning-type optical antenna. In addition, the scanning-type optical antenna can further receive the sector scanning light emitted from the target antenna to track the target antenna. In this way, the scanning-type optical antenna can automatically and accurately aim at the target antenna without manual manipulation or additional assistant tools. Therefore, the scanning-type optical antenna is of high tolerance, convenient to use and efficient.

Moreover, according to one embodiment of the present disclosure, the scanning-type optical antenna can automatically and accurately aim at the target antenna, so is very suitable for various mobile vehicles and transportation systems.

Furthermore, according to one embodiment of the present disclosure, the optical transmitting/receiving structure of the scanning-type optical antenna is specially designed to make the light signal receiver and the position sensor be coupled to and corresponding to each other. In this way, the light signal receiver and the position sensor can be considered at the same optical axis, so the mirror controller can more effectively fine-tune the input signal light to precisely aim the input signal light at the light signal receiver. Accordingly, the signal quality of the scanning-type optical antenna can be improved.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A scanning-type optical antenna, comprising:
a housing, comprising a window;
a scanning light receiver, disposed on the housing and configured to receive an input sector scanning light emitted from a target antenna to generate plural light speckles;
a rotational mechanism, wherein the housing is mounted on the rotational mechanism and the rotational mechanism adjusts a deflection angle between the housing and the target antenna according to the light speckles;
a fine-tune mirror, disposed outside the housing and corresponding to the window;
a light signal emitter, disposed inside the housing and configured to transmit an output signal light to the target antenna after the output signal light passes through the window and is reflected by the fine-tune mirror; and
a light signal receiver, disposed inside the housing and configured to receive an input signal light transmitted from the target antenna after the input signal light is reflected by the fine-tune mirror and passes through the window.

2. The scanning-type optical antenna of claim 1, further comprising a scanning light emitter disposed on the housing and configured to emit an output sector scanning light to the target antenna.

3. The scanning-type optical antenna of claim 2, further comprising a scanning light source and a beam forming element, wherein a beam emitted from the scanning light source passes through the beam forming element to generate the output sector scanning light.

4. The scanning-type optical antenna of claim 3, wherein the scanning light emitter further comprises a scanning mirror configured to be continuously rotating to reflect the output sector scanning light so as to change a direction of the output sector scanning light.

5. The scanning-type optical antenna of claim 1, wherein the scanning light receiver comprises a light sensing element configured to sense the input sector scanning light so as to generate the light speckles.

6. The scanning-type optical antenna of claim 5, wherein the rotational mechanism rotates the housing to make a center part of the light speckles coincide a center of the light sensing element.

7. The scanning-type optical antenna of claim 1, wherein the rotational mechanism comprises a rotational mechanism controller configured to compare shapes and positions of the light speckles with a database so as to calculate the deflection angle between the housing and the target antenna.

8. The scanning-type optical antenna of claim 1, further comprising a first beam splitter configured to reflect the output signal light to the target antenna after the output signal light passes through the window and is reflected by the fine-tune mirror.

9. The scanning-type optical antenna of claim 8, further comprising a second beam splitter and a position sensor, wherein the input signal light passes through the first beam splitter and is split by the second beam splitter into a first input signal light transmitted to the light signal receiver and a second input signal light transmitted to the position sensor.

10. The scanning-type optical antenna of claim 9, wherein a light transmission path of the first input signal light is perpendicular to a light transmission path of the second input signal light.

11. The scanning-type optical antenna of claim 9, further comprising a mirror controller, wherein the position sensor generates an adjustment signal according to the second input signal light and the mirror controller adjusts the fine-tune mirror according to the adjustment signal so as to fine-tune the input signal light.

12. A control method for a scanning-type optical antenna, comprising:
receiving an input sector scanning light emitted from a target antenna by a scanning light receiver disposed on a housing to generate plural light speckles;
rotating the housing according to the light speckles by a rotational mechanism to adjust a deflection angle between the housing and the target antenna;
emitting an output signal light by a light signal emitter disposed inside the housing, wherein the output signal light is transmitted to the target antenna after passing through a window of the housing and being reflected by a fine-tune mirror; and
receiving an input signal light transmitted from the target antenna by a light signal receiver disposed inside the housing, wherein the input signal light is transmitted to the light signal receiver after being reflected by the fine-tune mirror and passing through the window.

13. The control method of claim 12, further comprising:
emitting an output sector scanning light to the target antenna by a scanning light emitter.

14. The control method of claim 13, further comprising:
generating the output sector scanning light by controlling a scanning light source of the scanning light emitter to emit a beam passing through a beam forming element of the scanning light emitter.

15. The control method of claim 14, further comprising:
continuously rotating a scanning mirror of the scanning light emitter to reflect the output sector scanning light so as to change a direction of the output sector scanning light.

16. The control method of claim 12, further comprising:
sensing the input sector scanning light by a light sensing element of the scanning light receiver so as to generate the light speckles.

17. The control method of claim 16, further comprising:
rotating the housing by the rotational mechanism to make a center part of the light speckles coincide a center of the light sensing element.

18. The control method of claim 12, further comprising:
comparing shapes and positions of the light speckles with a database by a rotational mechanism controller of the rotational mechanism so as to calculate the deflection angle between the housing and the target antenna.

19. The control method of claim 12, further comprising:
reflecting the output signal light by a first beam splitter; and transmitting the output signal light to the target antenna after the output signal light passes through the window and is reflected by the fine-tune mirror.

20. The control method of claim 19, further comprising:

the input signal light passing through the first beam splitter and being split by a second beam splitter into a first input signal light and a second input signal light; and transmitting the first input signal light to the light signal receiver; and transmitting the second input signal light to a position sensor.

21. The control method of claim 20, further comprising:

generating an adjustment signal according to the second input signal light by the position sensor; and adjusting the fine-tune mirror according to the adjustment signal by a mirror controller so as to fine-tune the input signal light.

\* \* \* \* \*